D. CLARK.
APPARATUS FOR CONTROLLING TEMPERATURE IN CARS.
APPLICATION FILED MAR. 3, 1917.
1,264,900.
Patented May 7, 1918.
4 SHEETS—SHEET 1.
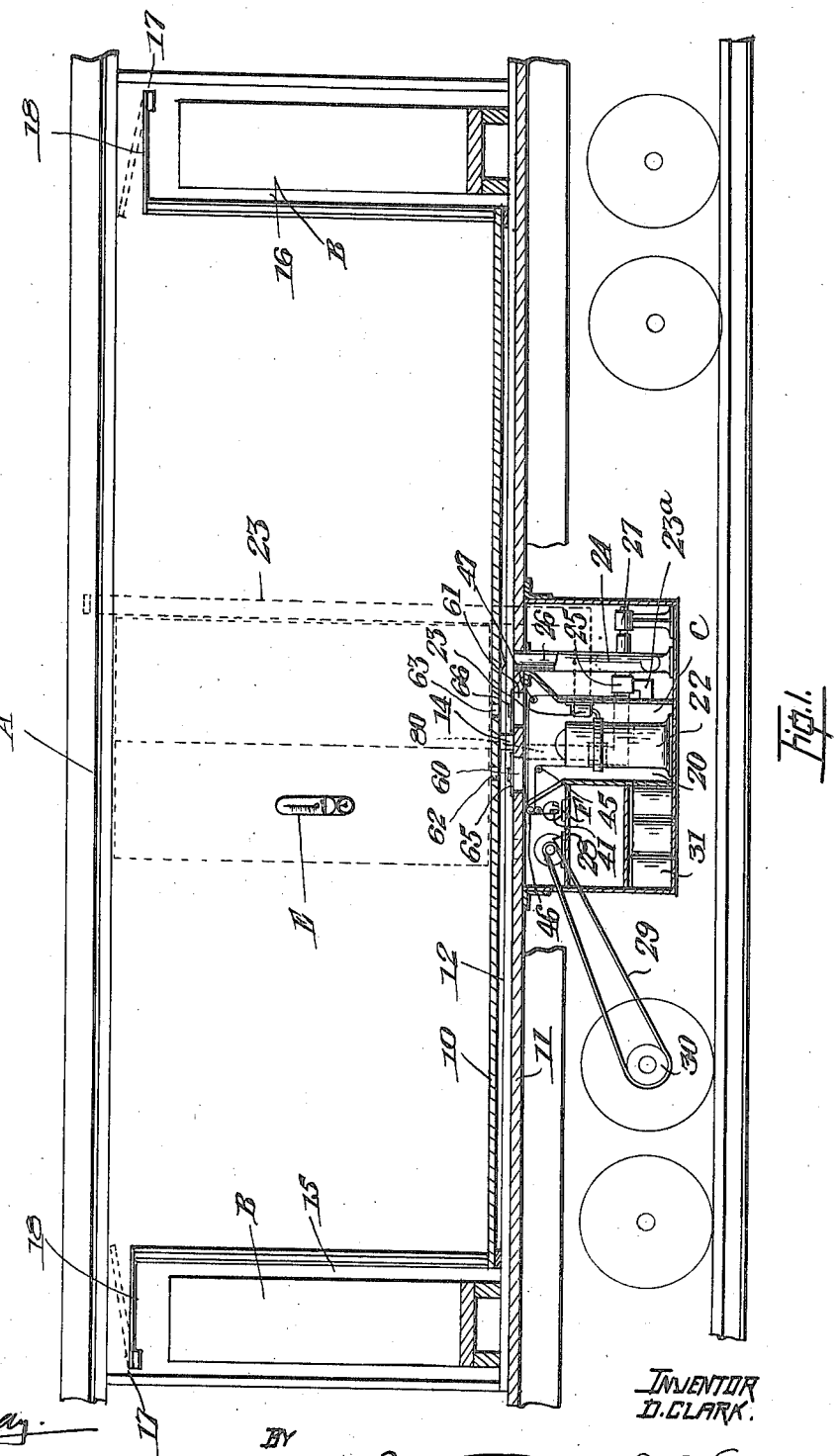

D. CLARK.
APPARATUS FOR CONTROLLING TEMPERATURE IN CARS.
APPLICATION FILED MAR. 3, 1917.

1,264,900.

Patented May 7, 1918.
4 SHEETS—SHEET 2.

WITNESS

INVENTOR
D. CLARK
BY
Fetherstonhaugh & Co.
ATTYS.

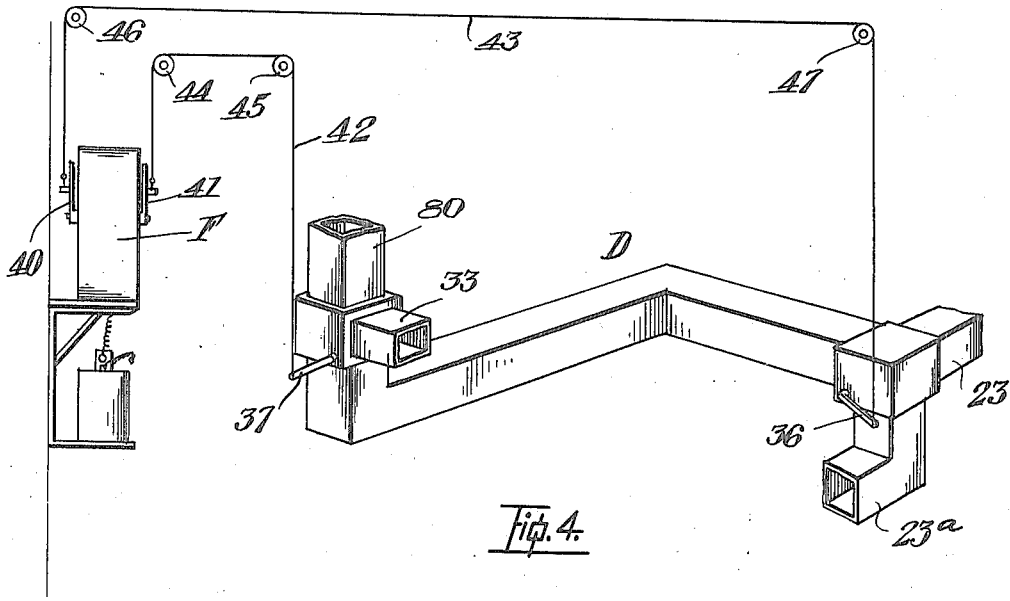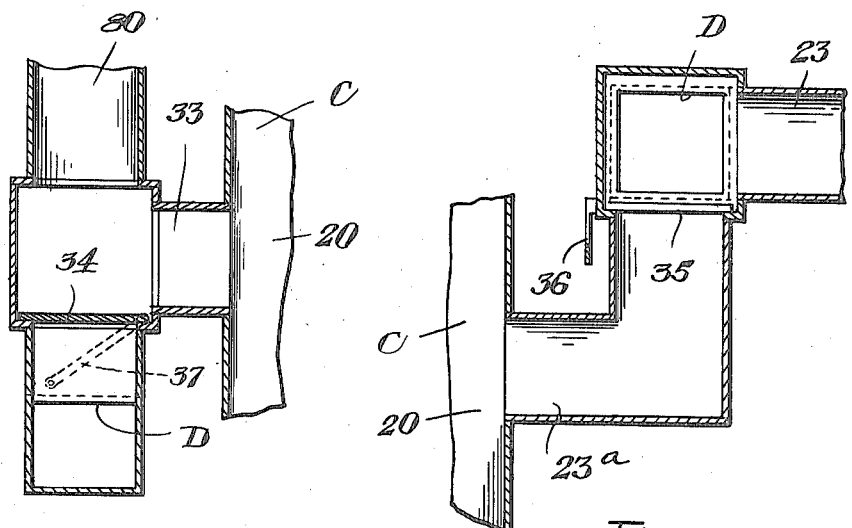

D. CLARK.
APPARATUS FOR CONTROLLING TEMPERATURE IN CARS.
APPLICATION FILED MAR. 3, 1917.

1,264,900.

Patented May 7, 1918.
4 SHEETS—SHEET 4.

WITNESS

INVENTOR
D. CLARK
BY
Fetherstonhaugh & Co.
ATTYS.

UNITED STATES PATENT OFFICE.

DANIEL CLARK, OF EDMONTON, ALBERTA, CANADA.

APPARATUS FOR CONTROLLING TEMPERATURE IN CARS.

1,264,900.     Specification of Letters Patent.     Patented May 7, 1918.

Application filed March 3, 1917. Serial No. 152,427.

*To all whom it may concern:*

Be it known that I, DANIEL CLARK, a subject of the King of Great Britain, and a resident of the city of Edmonton, in the Province of Alberta, in the Dominion of Canada, have invented certain new and useful Improvements in Apparatus for Controlling Temperature in Cars, of which the following is a full description.

This invention relates to improvements in cars and particularly to such as are intended to carry grain or provisions, and in which it is desirable that a uniform temperature should be maintained, whereby in summer the temperature in the car may be maintained at any determined point below the outside temperature, and in winter it may be kept above the outside temperature.

The objects of the invention are to provide simple and effective means of maintaining the temperature at a uniform point and also automatically regulating the temperature whereby the car will require a minimum attention during use.

The present invention forms an improvement on a car described in my application Serial Number 204,572 in Canada, and Number 114,486 in the United States, filed August 11th, 1916. In my aforesaid application, means were provided for continuously circulating a current of air in the space provided on the double walls and floors of the car.

In the present invention a thermostat is incorporated in this system connected by the mechanism which automatically regulates the temperature of the car. For a complete description of the invention, however, reference is made to the following specification and accompanying drawings.

In the drawings,

Figure 1 is a sectional elevation of an embodiment of the invention.

Fig. 4 is a perspective detail of the control mechanism for the temperature regulating valves.

Fig. 5 is a sectional detail through one of the controlling valves.

Fig. 6 is a sectional detail through the other control valve.

In the drawings like characters of reference indicate corresponding parts in the several figures.

Figure 3:
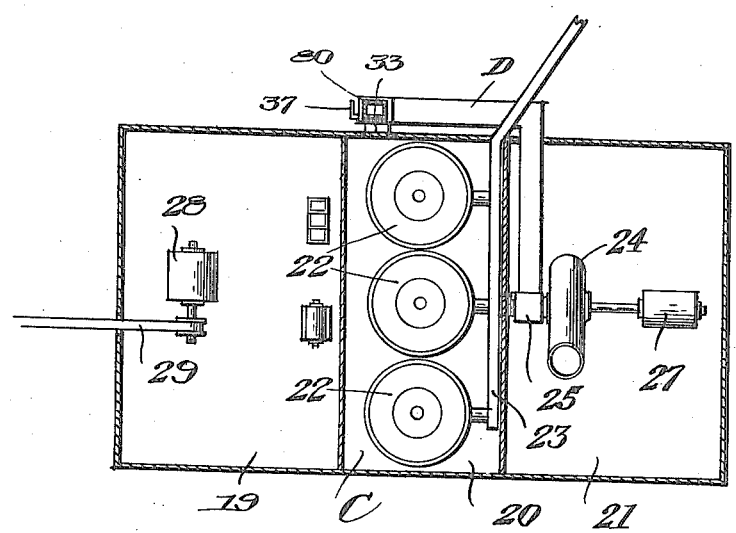
Fig. 3 is a sectional plan view of the heating chamber.
Figure 2:
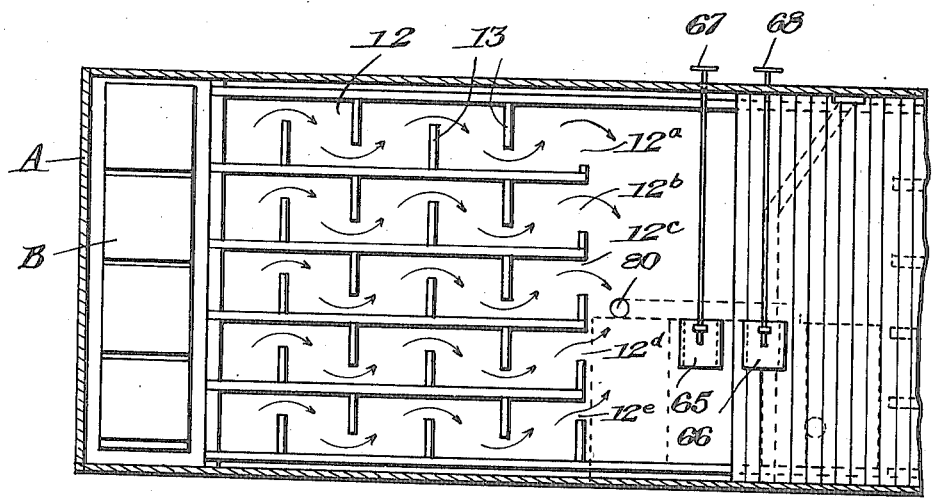
Fig. 2 is a plan view of the car, part of the floor being removed, showing the interior construction.
Figure 7:
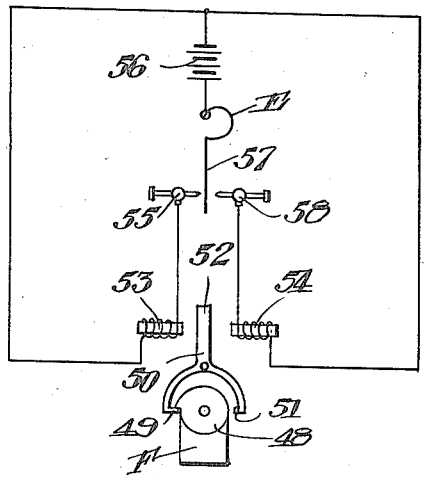
Fig. 7 is a diagrammatic view indicating the connections for the furnace valve.

Referring to the drawings, A represents a train or freight car of usual construction, except as modified for the purpose of this invention as herein described.

The car is formed with a double or false bottom 10, above the floor 11, the space between which and the floor forms a series of air ducts 12 which may be conveniently formed with stationary baffle plates 13 for the purpose of retarding the current of air circulating in order to obtain the maximum of heating or cooling effect therefrom as the case may be.

To cause uniform distribution of the air across the full width of the floor and to the different ducts 12, I form, by regulating the width of the openings $12^a$, $12^b$, $12^c$, $12^d$ and $12^e$ into the ducts, the openings near the point of distribution being of less width than those farther removed.

The ducts are separated by a partition 14 at the center, and the outer ends of the duct open into chambers 15 and 16 which may contain cooling means, such as tanks B of brine or ice. Passages 17 are left at the side of the top 18 of the chambers B.

In cool weather, when it is unnecessary to use the brine tanks, the covers 18 are adapted to be raised into the position shown in dotted lines in Fig. 1, whereby the circulation of air through the car and chambers and in the air duct will be facilitated.

Beneath the car is suitably supported a heating chamber C, which contains compartments 19, 20 and 21. The compartment 20 contains a source of heat, such as stoves 22, the waste gas from which discharges into a conduit 23, which conduit extends beneath the floor up the side wall of the car finally discharging through the roof thereof.

The chamber 21 contains a blower 24 or other means of circulating the air, the intake of which blower is connected by a conduit 25 with the interior of the compartment 20 from which it draws the heated air. The blower discharges into a conduit 26, which distributes to the air duct 12 on one side of the car, and from thence to the end of the car upwardly through the interior and returning at the opposite end.

The fan is driven by any convenient means such as the electric motor 27.

The chamber 19 conveniently contains electric generator 28 which may be connected by a belt 29 to a pulley 30 on the axle of the car wheels, the generator being connected in the usual way with a series of storage batteries 31, adapted to be charged while the car is running and to discharge when the car is stationary, and thus maintain a constant power for operation of the motor for the blower.

In further accordance with the present invention, means are provided controlled by the temperature of the car for automatically regulating the circulation of air. These means comprise a bypass passageway D leading from the inlet 33 to the heating chambers 20 and from thence to the blower. This bypass passageway is controlled at opposite ends by swing valves 34 and 35 having external operating levers 36 and 37.

When these valves are in normal position, the bypass passageway will be closed at opposite ends and the circulating air will pass from the air ducts 12 into the heating chamber 20, thence into the conduit 25.

When moved to the opposite position the inlet 33 to the hot air chamber 20, will be closed as well as the outlet passage 23ª from the hot air chamber, and the air will simply pass through the bypass passageway D to the fan. In this way the circulation of air will be maintained but no heat will be imparted to the same.

The automatic regulation of the valves 34 and 35 is accomplished by a suitable form of thermostat E located in a convenient position in the car and controlling a spring motor F operatively connected to the valve operating levers 36 and 37.

I may state that the thermostatic regulating device is similar to that employed in various forms of thermostatic regulators for household use furnaces. The motor F is provided with cranks 40 and 41 connected by chains or cords 42 and 43 with the levers 36 and 37, the said cords running over suitable pulleys 44 and 45, 46 and 47.

The spring motor is arranged, when released, to turn half a revolution and then stop. The means I have shown for accomplishing this comprise a ratchet wheel 48 carried by the spring motor having a single tooth thereon which is adapted to be engaged by a pawl 49 on a pivoted dog 50, the said dog being also formed with a pawl 51 diametrically opposite the pawl 49 and adapted to be moved into engaging position as the pawl 49 is moved to released position, whereby it will engage the ratchet tooth and stop the motor after it has turned a half revolution.

The movement of the pivot dog 50 is controlled by an armature 52, in turn controlled by electro-magnets 53 and 54. The electro-magnet 53 is connected in series with a contact 55, a battery 56 and the contact element 57 of the thermostat.

The electro-magnet 54 is connected in a series with a contact 58, a battery 56 and the contact element 57.

The contacts 55 and 58 are on opposite sides of the element 57, whereby when the temperature moves a given amount in either direction, from a given normal, contact will be made.

In order to provide for the circulation of air should the fan, for any reason stop running, apertures 60 and 61 are provided in the floor beneath corresponding apertures 62 and 63 in the double floor or false bottom and controlled by manually operatable sliding doors 65 and 66, the operative handles 67 and 68 of which extend outwardly at the side of the car.

It will also be observed that a circulation of air may be obtained without operation of the blower by opening the door 66. When this door is open and the stoves are heated, the hot air will circulate in an upward direction while the cooler air will pass downwardly and through the ducts 12. The air instead of passing through the blower will in this case pass direct into the ducts 12, thence complete the circuit as before.

Figure 8:
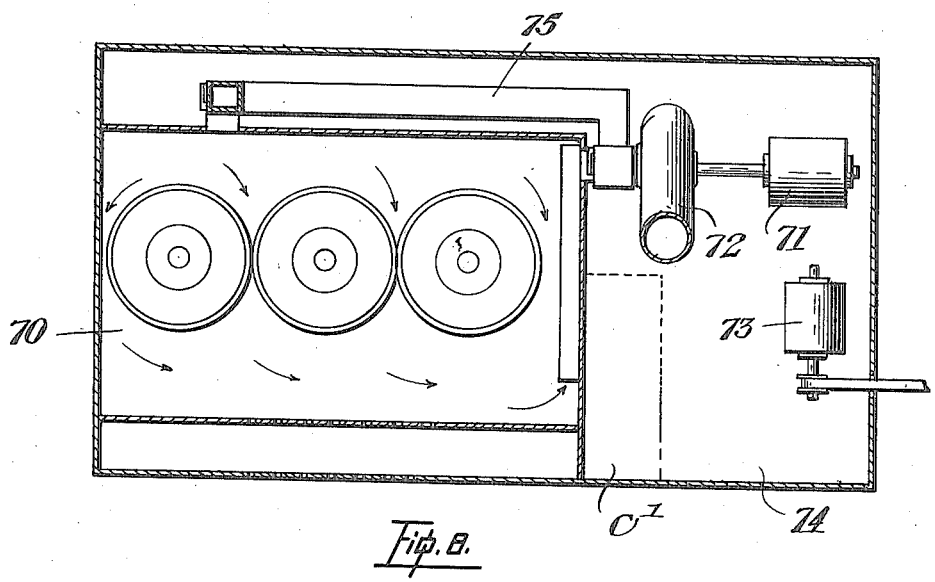
Fig. 8 is a sectional plan view of an alternative form of heating chamber.

In the alternative arrangement shown in Fig. 8, the heating compartment C' has the heating chamber 70, at one end thereof, while the motor 71, fan 72, generator 73 are located in the compartment 74. 75 represents the bypass passageway which is connected and operated in the same manner as described for the other form of invention.

Having now described the various parts of my invention, I will briefly describe the method of operation of the same.

Assuming that the car has been loaded in winter and it is desirable to maintain a temperature of say 34 degrees Fahrenheit in the interior of the car, before closing the car the temperature regulator on the thermostat E will be set at 34 degrees, the car is then closed. The stoves or heaters are then filled and put in position in the heating chamber, the waste gas from the combustion of the coal or fuel will collect in the conduit 23 and pass out through the roof. The heated air around the stoves will pass through the valve 25 into the blower 24, thence to the air ducts 12 at the right hand end of the car as shown in Fig. 1. The heated air passes along the bottom of the car which heats the same and will finally pass through the compartment 16 at the end thereof and discharge into the interior of the car at the top continuing in circulating the air and gradually losing its heat units, the air will pass through the compartment 15, thence through the air duct 12 at the left hand end of the car to the conduit 80, thence through the conduit 33 back into the hot air chamber 20.

While the car is stationary, the blower will be operated by the motor 27 actuated by the storage battery or other prime mover, and while the car is in motion, it will be actuated by the generator 28 in a manner well known in the art.

In the event of the temperature of the car rising to any appreciable extent, as for example to 35 or 36 degrees, the contact element on the thermostat will engage, for example, the contact 58 completing the circuit through the electro-magnet 54, swinging the pivoted dog 50 and releasing the ratchet wheel on the spring motor F, which will thereupon make a half revolution until stopped by the tooth 51.

During this half revolution, the cranks 40 and 41 in their movement will pull on the cords or chains 42 and 43, swinging the valves 34 and 35 through the levers 36 and 37 and moving them in such a position that the hot air chamber 22 will be cut off and the air will be caused to pass through the bypass passageway D, in which case, no heat will be imparted to the circulating air, gradually the temperature will fall, when it falls below the given normal the contact element will make contact with the contact 55 completing the circuit which energizes the electro-magnet 53, swinging the pivoted dog 50 to the opposite side and permitting of the ratchet wheel 48 and the cranks 40 and 41 to turn half a revolution moving the valves 34 and 35 to their original position in which the heating units will be continued to be imparted to the circulating air.

It will be obvious that instead of imparting heating units to the air in the chamber 22, the heating units might be abstracted therefrom by any suitable refrigerating apparatus, as by means of ice contained in the chamber. The brine tank B may also be used for a refrigerating purpose.

Although the thermostatic controlling device illustrated is electric in its operation, it is to be understood that other well known forms of thermostatic controlling devices which are on the market may be used. Some of these devices are operated by compressed air and this would be of some advantage in the present invention, in that, the compressed air could be supplied from the train line pipe of the air brake system.

As many changes could be made in the above description and many apparently widely different embodiments of my invention within the scope of the claims constructed without departing from the spirit or scope thereof, it is intended that all matter contained in the accompanying specification and drawings shall be interpreted as illustrative and not in a limiting sense.

What I claim as my invention is:

1. A car having a double bottom with air ducts between divided by a central partition, a compartment below the partition having a temperature chamber through which air is adapted normally to pass, means for circulating the air and a bypass passageway adapted, when opened to permit the air to circulate without passing through the temperature chamber.

2. A car having a double bottom with air ducts between divided by a central partition, a compartment below the partition having a temperature chamber through which air is adapted to normally pass, means for circulating the air and a bypass passageway adapted when opened to permit the air to circulate without passing through the temperature chamber and a plurality of staggered baffle plates in the air ducts.

3. In a car, a temperature regulating chamber on the under side thereof, apertures connecting the chambers with the interior of the car, means for controlling the apertures, air ducts in the car connected in series with the temperature chamber and means for circulating air through the temperature chamber.

4. In a car, a temperature regulating chamber on the under side thereof, apertures connecting the chambers with the interior of the car, means for controlling the apertures, air ducts in the car connected in series with the temperature chamber and means for circulating air through the temperature chamber, and a bypass passageway adapted when open to permit the air to circulate without passing through the temperature chamber.

5. A car having a double wall and mechanical air circulating means, and means for heating or cooling the air, and a door adapted when open to permit natural circulation of the air without operation of the means for mechanically circulating the air.

6. In a car, a double wall, an air conduit leading from one side of the same, a plurality of air ducts having outlets or openings adjacent to the air conduit, the width of said opening being increased in proportion to the distance away from the opening of the air conduit.

In witness whereof I have hereunto set my hand in the presence of a witness.

DANIEL CLARK.

Witness:
RUSSEL S. SMART.